Jan. 13, 1953 J. W. CARTER 2,625,255
DISTRIBUTING AND FEEDING MECHANISM
Filed July 31, 1947 12 Sheets-Sheet 1

Inventor
Jack W. Carter

By Shrex, Crowe + Gorden
Attorneys

Jan. 13, 1953  J. W. CARTER  2,625,255
DISTRIBUTING AND FEEDING MECHANISM
Filed July 31, 1947  12 Sheets-Sheet 3

Inventor
Jack W. Carter
By Shreve, Crowe & Gordon
Attorneys

Jan. 13, 1953  J. W. CARTER  2,625,255
DISTRIBUTING AND FEEDING MECHANISM
Filed July 31, 1947  12 Sheets-Sheet 5
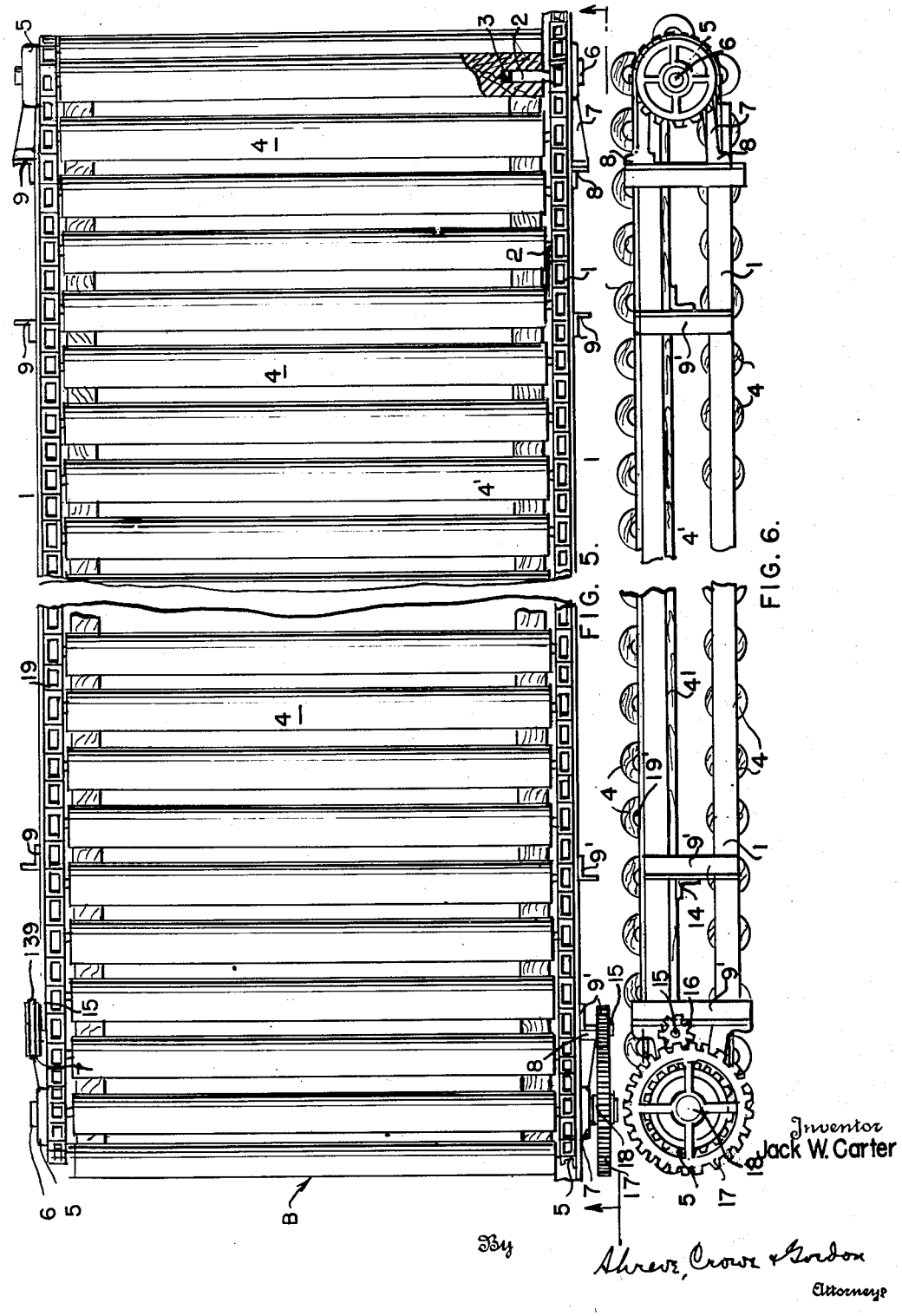
Inventor
Jack W. Carter
By Shreve, Crowe + Gordon
Attorneys Jan. 13, 1953  J. W. CARTER  2,625,255
DISTRIBUTING AND FEEDING MECHANISM
Filed July 31, 1947  12 Sheets-Sheet 6
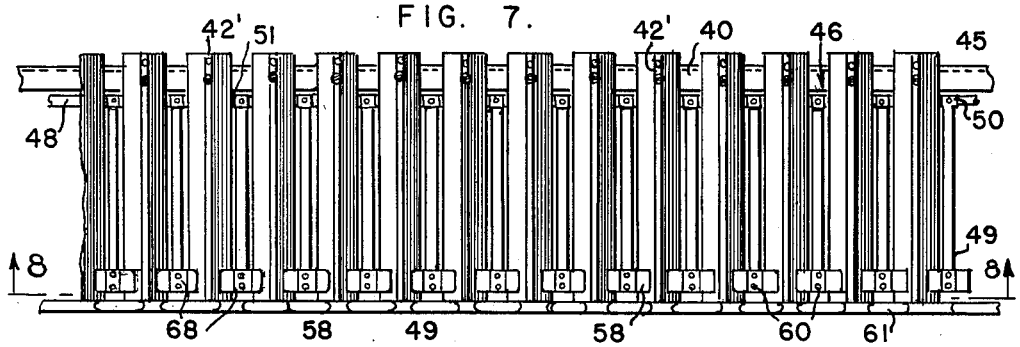
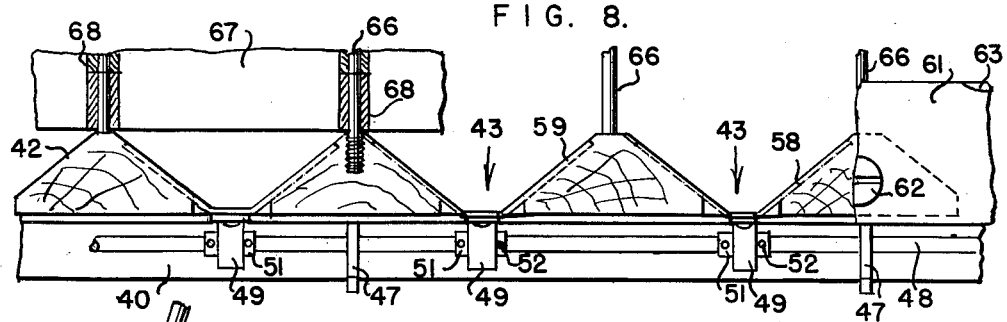
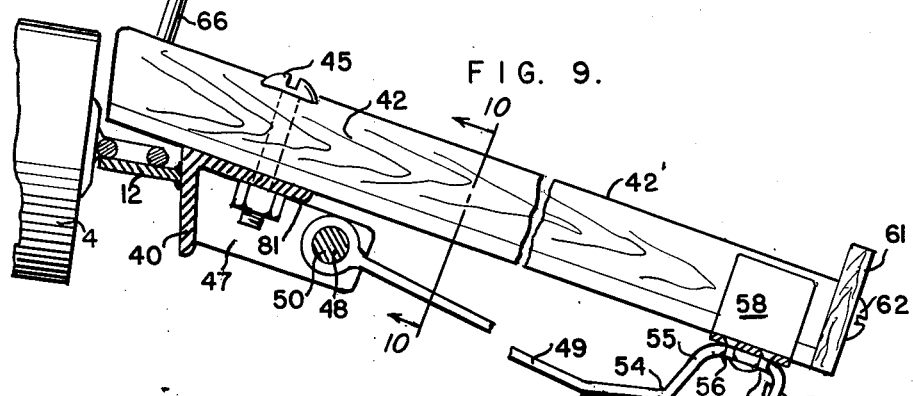
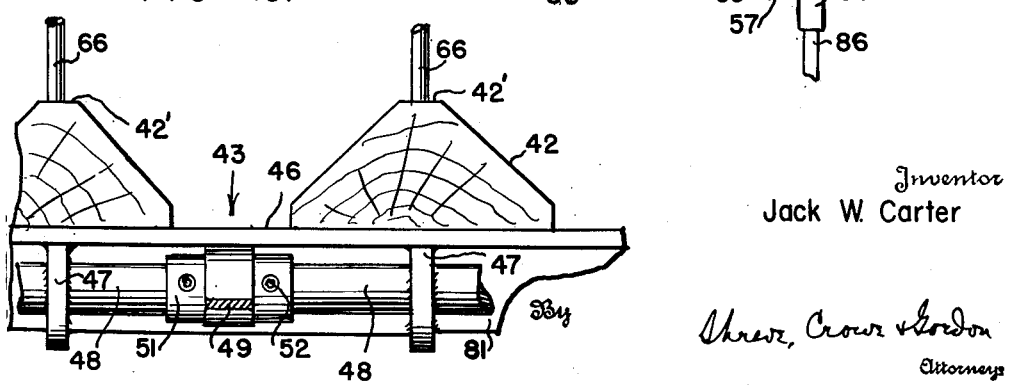
Inventor
Jack W. Carter
By Shreve, Crown & Gordon
Attorneys Jan. 13, 1953  J. W. CARTER  2,625,255
DISTRIBUTING AND FEEDING MECHANISM
Filed July 31, 1947  12 Sheets-Sheet 8

Inventor
Jack W. Carter
By
Shreve, Crowe & Gordon
Attorneys

Inventor
Jack W. Carter
By Shreve, Crowe + Gordon
Attorneys

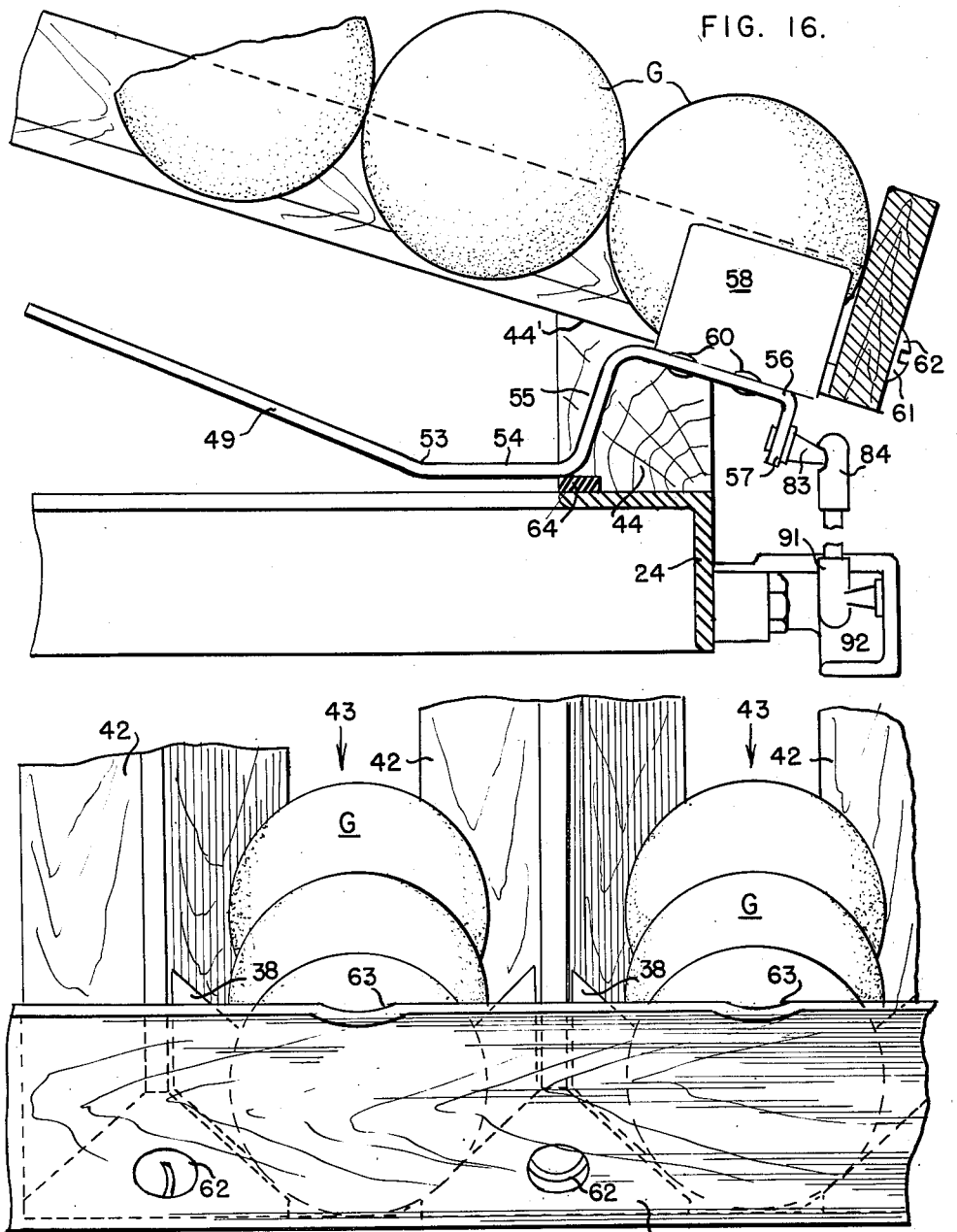

Inventor
Jack W. Carter

Jan. 13, 1953 J. W. CARTER 2,625,255
DISTRIBUTING AND FEEDING MECHANISM
Filed July 31, 1947 12 Sheets-Sheet 12

Inventor
Jack W. Carter
By Shreve, Crown & Gordon
Attorneys

UNITED STATES PATENT OFFICE 2,625,255

DISTRIBUTING AND FEEDING MECHANISM

Jack W. Carter, Winter Haven, Fla., assignor to Fulton Bag & Cotton Mills, Atlanta, Ga., a corporation of Georgia Application July 31, 1947, Serial No. 765,135

10 Claims. (Cl. 198—66)

Generically this invention relates to distributing and packaging machines, but it is more particularly directed to an apparatus for packaging citrus fruit, vegetables, or other objects of a spherical nature, and including instrumentalities for distributing and feeding such spherical objects, bag holding means, and filled bag closing and delivery means.

A principal object of this invention is the provision of a fruit packaging mechanism of this character embracing what may be termed three main divisions or units, namely, a distributing and feeding mechanism, a bag holding carriage and track assembly and a filled bag closing and delivery unit, adapted to distribute and deliver a predetermined number of the objects to be packaged to each bag in the course of its travel through the machine.

Another important object of this invention is the provision of a fruit distributing and feeding mechanism including a plurality of juxtapositioned angularly disposed fruit or other object feed chutes, corresponding in number to the number of objects to be contained in each bag, and an angularly disposed endless conveyor for distributing the fruit or other objects to said chutes and rotating the same as they are delivered thereto.

A further important object of this invention is the provision of an endless roller fruit distributing conveyor associated with a plurality of juxtapositioned feed chutes angularly disposed with respect to said conveyor, said conveyor adapted to effect distribution of the fruit and to discharge the fruit from the side of the conveyor to said chutes, said chutes cooperating with traveling multiple bag holding mechanisms underlying the lower ends of said chutes, and means for delivering a single object from the lower end of each chute to each of the bags as they pass thereunder during their travel through the machine.

Another important object of this invention is the provision of a fruit or other spherical object distributing and feeding mechanism including a plurality of fruit holding and feeding chutes, a supporting track and endless conveyor chain associated therewith, a plurality of bag holder carriage elements connected to said chain and supportingly mounted on said track, each of said carriages including collapsible jaw members adapted to engage in the open mouth of the bags and expansible to supportingly carry said bags, and coacting means associated with the lower end of each of the respective chutes to automatically deliver the lowermost object therein to each bag as the bag passes under said chute during its travel through the machine.

Another important object of this invention of a fruit distributing conveyor adapted to effect rotation of the fruit being distributed and to deliver it sidewise therefrom to a plurality of chutes angularly disposed with respect to said conveyor, the number of chutes corresponding to the number of objects to be contained in the filled bags, an endless conveyor and bag carrying jaw assembly adapted to effect travel of the respective bags beneath the discharge end of said chutes, and means for effecting the delivery of an object from each of the chutes successively to the respective bags during their travel thereunder, and a bag delivery unit adapted to receive the filled bags from the holders and effect their closure by passing them through a sewing unit.

More specifically, the subject matter of this application relates to the distributing and feeding mechanism for distributing the fruit or other objects to be packaged, to open mesh bags or the like during their travel through the machine.

The bag holders, carriage and track assembly or mechanism, including the track, the specific bag holder carriage units, and an endless conveyor causing said units to traverse said track and effect travel of the bag holders in bag filling relation with respect to the feeding mechanism to effect filling of the bags during their course of travel through the machine is more specifically the subject matter of my co-pending application, Serial No. 765,136, filed July 31, 1947.

The bag closure and filled bag apparatus including conveyor means, bag mouth gripping and guiding mechanism and the sewing unit, is more specifically the subject matter of my co-pending application, Serial No. 765,137, filed July 31, 1947.

Another important object of the instant invention is the provision of a plurality of feed chutes angularly disposed with respect to the fruit or other objects distributing conveyor, so constructed as to gravitationally feed objects of a spherical nature throughout a wide range of varying dimensions without requiring adjustment, to the bags during their travel through the machine.

A still further object is the provision of means for automatically delivering the lowermost fruit or object in each of the feed chutes to each bag as the bag passes under said chute during its travel through the machine, and at the same time holding the adjacent fruit or object and the remaining column of fruit in said chute against downward movement during the feeding action of the lowermost fruit.

Another object of the invention is the provision of an elevating ejector mechanism for delivering the lowermost object in each of the feed chutes to each bag as it passes under said chute, said mechanism comprising an ejector rod finger rotatably mounted at its rear end and normally extending downwardly at an angle and upwardly at an angle, forming a fruit engaging seat and retaining shoulder, and supporting a substantially V-shaped single fruit or other object automatic elevating ejecting member, whereby said member when moved upwardly in ejecting direction, will elevate a single fruit or object and eject it from said chute, said finger at the same time holding the remaining column of fruit against gravitational descent during the ejecting operation.

With these and other objects in view, which will became apparent as the description proceeds, the invention resides in the construction, combination, and arrangement of parts, hereinafter more fully described and claimed, and illustrated in the accompanying drawings, in which like characters of reference indicate like parts throughout the several figures, of which:

Fig. 5 is an enlarged plan view partly in section of the roller fruit distributing conveyor.

Fig. 6 is an elevation of the conveyor shown in Fig. 5.

Fig. 7 is a plan view of the feed chutes.

Fig. 8 is a fragmentary sectional view taken on the line 8—8 of Fig. 7.

Fig. 9 is an elevational view of one of the feed chutes and associated parts, partly in section.

Fig. 10 is a fragmentary section with parts in elevation taken on the line 10—10 of Fig. 9.

Fig. 16 is an enlarged fragmentary sectional view of one of the feed chutes with parts of the ejector mechanism in side elevation, showing the lowermost fruit in position prior to ejection.

Fig. 17 is a fragmentary front elevation showing the arrangement of the columns of fruit in the chutes.

Fig. 21 is a diagrammatic view of the driving mechanism.

Figure 1:
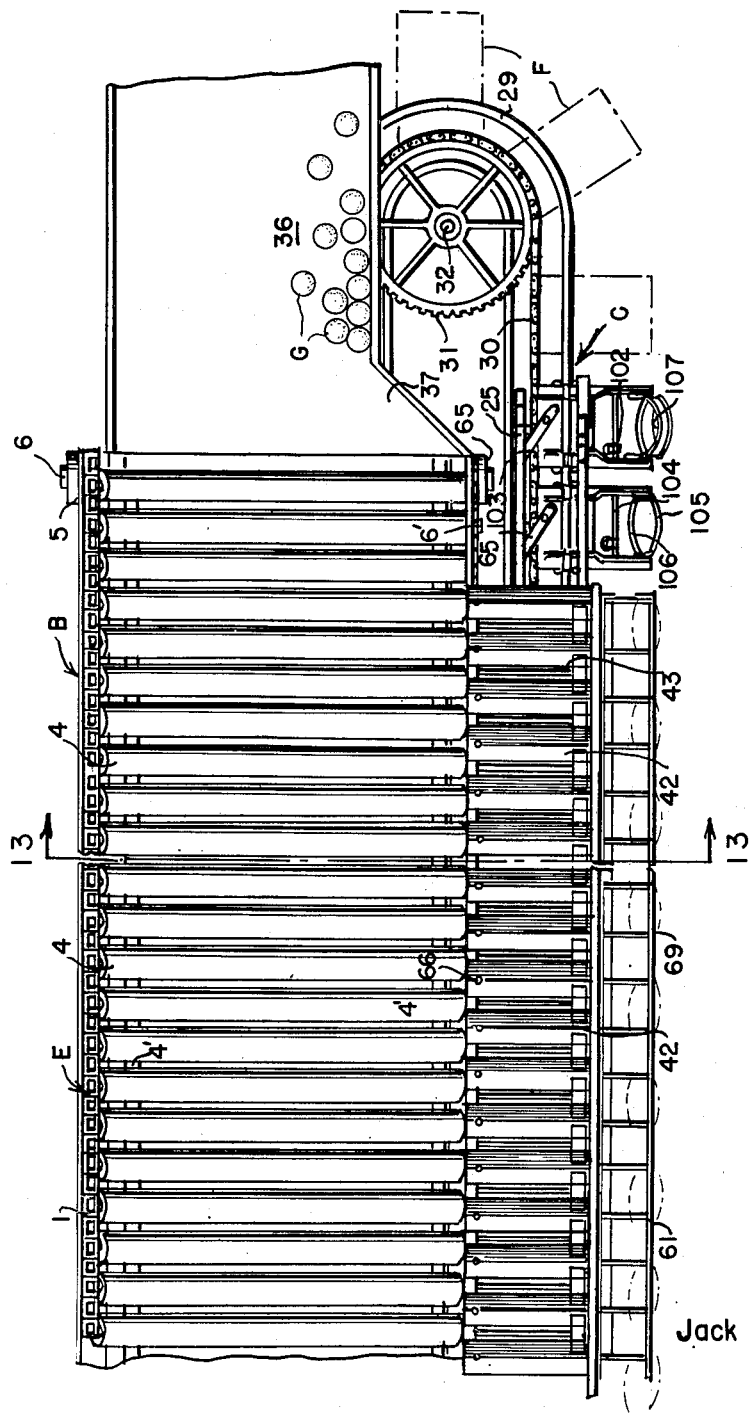
Fig. 1 is a top plan view of a portion of my improved fruit distributing and packaging machine.

The machine of the present construction comprises three units which may be referred to as (one) the distributor and feeding mechanism, (two) the bag holders, carriage and track mechanism or assembly, and (three) the filled bag closure and delivery unit.

Generally speaking, the distributor unit consists of rolls mounted on two endless chains to form a conveyor. Two wooden strips under the rolls, one near each end, support the weight of the rolls and cause them to rotate as they are pulled along by the chains. The material composing the rolls, and the dimensions of the said rolls are not critical and depend upon the particular size and the capacity of the installation. The weight of the return, or lower side of the distributor, is carried directly by the chains, which slide in steel angles which form a part of the frame.

The entire distributor assembly is sloped sideways toward the front of the machine at an angle somewhat greater than the angle of repose of the fruit being handled, for example, an angle of approximately six degrees to the horizontal. This angle of slope however is not critical, but should be sufficient to maintain the fruit gravitationally rotating constantly by the rotation of the rolls during their travel in distributing direction and maintain the fruit crowding down to the front side of the machine to discharge chutes which direct the fruit to the bags. The counting is done by lifting one piece of fruit from each chute in succession as the bag carrier moves along under the chutes, the number of which correspond to the number of objects desired to be contained in the bag. The chutes which are not being used are closed by a bar or other suitable closure means disposed across the upper ends of the chutes. It will be apparent that the number of chutes can be varied to suit conditions in accordance with the desired capacity of the machine.

Preferably the chutes are formed of triangular shaped wooden strips, in the present instance, two and three-fourths inches wide by one and one-fourth inches thick, arranged parallel on four inch centers. Elevating ejector rods or levers are pivoted at their upper ends on a rod which runs the length of the chute assembly. Ejector cam arms are connected to the ejector rods by rods with ball and socket end connections for engagement by cam arms passing thereunder.

Fruit on the distributor in excess of that amount required to fill the chute spills over at the end into an inclined trough and rolls to an elevator to be carried up again to the entering end of the distributor for recirculation by suitable means mounted along the rear side of the machine (not shown).

The bag holders, carriage and track assembly, includes a plurality of bag holders. Each bag holder includes a mouthpiece constructed of two similar halves, constituting the jaws, pivotally mounted so that they can swing together to form a smooth solid approximately elliptical shape to facilitate putting on the empty bags at a high rate of speed. Also the jaws of each bag holder swing up toward an operator while they are closing, so that the bags may be mounted on the holder with a minimum of effort by the operator. When the jaws of each holder are allowed to open after the bag is placed on the holder a spring at each end holds the jaws apart and keeps them expanded in the mouth of the bag. A raised lip or bead around the lower edge of each mouthpiece or jaw projects into the open mesh-portion of the bag fabric just below the closely woven selvage top, and prevents the bag from slipping down under the weight of the fruit.

When the bag is on the mouthpiece the jaws are spread apart by the action of the tension springs and stand approximately vertical, forming a guide for the fruit dropping into the bag as well as gripping the mouth of the bag due to the projecting bead around their lower edges. The mouthpiece is automatically adjustable to hold bags of different circumferences, for example, eight pound and ten pound bags. Collapsing the mouthpiece jaws to receive an empty bag is accomplished as follows:

As each bag holder carriage continues its travel a cam formed on the forward portion of a cam track member, the latter extending the length of the chute assembly, engages a cam lever arm on the carriage, and through a connecting link causes the rear half of the mouthpiece to rotate around its pivot, which is common to both halves, the front half being connected to the rear through said springs, and also rotates around said common pivot until it strikes the stop, which stop is fixed to the frame of the carriage. The rotation of the rear half of the holder continues after the front half has been stopped, until the mouthpiece halves or jaws are brought together or collapsed, the springs then being extended, and during the interval of engagement of said lever arm with said cam an empty bag is placed on the holder, and passage of the lever from the cam releases the main half, allowing the springs to expand the jaws in the bag and hold them there under tension, and at the same time causing the mouthpiece to continue to move back and downwardly to a vertical expanded position to receive the fruit.

A lever arm carrying two cam rollers, one mounted to rotate in a vertical plane and the other in a horizontal plane, is connected to the front jaw by a link, and when said empty bag is in place with the two jaws standing approximately vertical as previously described, said lever also stands vertically, and as the respective carriages move along the feed chutes the cam arms connected to the fruit elevating ejector lifters are engaged by the vertical cam roller and raised in succession to lift and eject one piece of fruit from each chute. When there is no bag on a holder, the front jaw is pulled forwardly to a relaxed position by the springs, causing the lifting or ejecting cam lever to swing to the rear. In this position, as the carriage moves along the track under the feed chutes, the cam lever passes behind the ejector cam arms and no fruit is discharged.

At the end of the chute assembly where the filled bags are released to the conveyor of the bag closure unit, there are two cams which act simultaneously on the cam arms of the bag holder carriages previously described. One cam is formed on or affixed to the rear end portion of a short cam track extending parallel to said first mentioned cam track, and the other formed on or affixed to the rear end portion of said first mentioned track. The short track cam operating on the horizontally mounted roller on the cam lever arm that engages the fruit ejector cam arms causing the front jaw to be held, through the connecting link against the pull of the jaw springs. At the same time, the rear cam on the first mentioned cam track causes the rear jaw to move forwardly and collapse against the front jaw and release the top of the filled bag. The jaws are held in such collapsed position and rotated upward and outward to lift out of the bag's mouth. This action is the reverse of the action at the empty bag loading station, with the exception that the additional cam action of the horizontal roller of the lever connected to the front jaw is necessary.

Limit switches of a sensitive type, actuated by small feeler wires or levers, may be applied to the last two or three chutes in the line in order to have means of stopping the bag carriers if an insufficient supply of fruit is coming on the distributor. This, is an optional provision, and is not a required part of the equipment.

The filled bag closure and delivery unit closes the filled bags by sewing. The bags when filled are delivered to the sewing machine, the sewing head of which is mounted on a bracket which can be raised or lowered by a screw on the supporting column to adjust the height of the seam with relation to the top of the bag. Fixed to the same bracket which carries the sewing head are arms which carry small endless chains or belts which come together at the center lines of the conveyors and pass through the sewing head just above the needle and which structure is adjustable as a unit with said bracket. The purpose of these chains, belts or the like is to hold the mouth of the bag in a closed position in a straight line and deliver to the feed dogs of the sewing head. An operator may be stationed at the point of entry of the bag mouth into these gripper chains or belts, to insert the bag mouth into them in the correct position and alignment should it become necessary.

The lower part of the bag, and the weight of fruit or other contents, are supported by three endless conveyors, the horizontal or bottom one of which include endless chains on which are mounted slats or the like of suitable material. The two vertical conveyors adapted to grip the opposite sides of the filled bags have mounted on their respective upper and lower chains, an endless series of rectangular hollow box-like elements in which are detachably mounted and suitably secured resilient filled bag engaging members of sponge rubber or the like of a length substantially that of said bags, so as to afford an uninterrupted grip throughout the length of resilient members and the major portion of the bag to firmly support the fruit contents of the bag without bruising or damage thereto. All three conveyors together with the two small belts or chains which hold the bag mouth, are driven at the same speed by means of shafts at the discharge ends, which are geared together. The chain of sewing thread between ths bags is cut by a spring mounted knife mechanism automatically controlled by each bag as it passes from the sewing head.

The machine is driven by an electric motor preferably mounted beneath the rear end of the distributor conveyor mechanism and adjacent the filled bag closure and delivery unit. Said motor is adapted to drive a motor shaft extending rearwardly to the end of said bag closure unit to a gear box from which motive power is supplied to the rear shaft of the bottom filled bag conveyor and through gear connections to the rear vertical shafts of the adjacent vertical conveyors, these vertical shafts also driving the bag mouth engaging chains or belts. A pulley mounted on said motor shaft is adapted to drive the sewing head through a suitably operable friction clutch by means of a belt.

A shaft extending from the opposite side of said motor has driving connections with a gear box having driving connection with the shaft of the drive sprocket for the conveyor chain attached to the bag holder carriages. Said shaft also has driving connection with a drive pulley or sprocket mounted on the rear shaft of the distributor roller conveyor adapted to initially receive the fruit for distribution and packaging.

Having briefly described the three units constituting the complete machine, the first, or distributing and feeding mechanism, forming the subject matter of the instant application will now be described in detail.

In the illustrated embodiment characterizing this invention there is shown a citrus fruit or other substantially spherical object distributing and packaging machine A, including a distributing and feeding mechanism B, a bag holding carriage and track assembly C, and a filled bag closure and delivery assembly D.

The distributing and feeding mechanism B includes a fruit distributing conveyor E, comprising a pair of endless chains 1. In the present instance, each alternate link of the respective chains has suitably mounted thereon an inwardly projecting pintle or pin 2 adapted to project into a bearing opening 3 formed in the end of a roller 4 constructed of wood or other suitable material. At one end of the conveyor E the respective chains 1 are mounted on and adapted to travel over a sprocket wheel 5 mounted on an axle 6, each of said axles being mounted in yoke members 7 formed with oppositely extending feet portions 8, the feet portions of one yoke member are adapted to be welded or otherwise secured to an upright iron angle member 9 and the feet portions of the other yoke similarly secured to an angle member 9'. The members 9 are welded or otherwise secured to the upper end of the upright frame members 10 at an angle with respect thereto, and the members 9' are welded or otherwise secured to the upper ends of frame members 11 at a corresponding angle with respect thereto. The frame members 10 are of greater height than the frame members 11 so as to produce a slope of the roller conveyor E of approximately 6 degrees to the horizontal plane of the conveyor for a purpose directly more fully appearing.

Interconnecting the members 9 at their upper ends welded or otherwise secured thereto, is a chain angle track member 12, and interconnecting the lower ends of said members vertically spaced from member 12 is a similar track member 13, and at the opposite side of conveyor E similarly mounted and secured to the members 9' are similar track members 12 and 13. The upper stretch of chains 1 is adapted to slidably travel on track member 12, and the lower stretch of said chains on track members 13. Interconnecting the members 9 and 9', welded or otherwise secured thereto, are the cross beams 14 on which are suitably mounted the strips 4' constructed of wood or other suitable material, adapted to support the weight of the rolls 4 and cause them to rotate as they travel thereover, the rolls of the lower stretch being carried by the chains slidably supported by the track member 13. Suitably mounted at the rear end of the conveyor on members 9 and 9' is a drive shaft 15 having keyed or otherwise mounted on one end thereof a drive pinion 16 adapted to mesh with sprocket wheel 17 mounted on the extended end 18 of shaft 6, the opposite end of said shaft 15 being suitably connected to a source of motive power for driving said conveyor, as will hereinafter be more fully explained. Intermediate the members 9 and 9' at each end of the conveyor are a plurality of similar members at spaced intervals forming similar continuations of frame members 10 and 11, respectively.

Beneath conveyor E and extending beyond the front and rear ends thereof is an ovally arranged series of vertical angle iron or the like frame standard members 19 adapted to support the lower oval endless track 20 welded or otherwise secured thereto as will be well understoood. Overlappingly secured to the outer surfaces of the respective standards 19 are the vertical extension frame members 21 welded or otherwise united therewith, and the members 21 nearest frame members 10 are connected thereto by the cross beams 22 welded or otherwise secured. The opposite series of members 21 have similarly secured to their upper ends the horizontal frame members 23, the free ends of which are connected by the angle frame member 24 of a length substantially corresponding to that of conveyor E suitably secured thereto by welding or otherwise.

Welded, bolted or otherwise to the extensions 21 below cross beams 23 is the longitudinally extending cam track angle bar 25 for a purpose hereinafter more fully appearing. The spaced series of frame extensions 21 are connected by cross bars 26 to which are suitably anchored the lower ends of frame members 11 as at 27. Also suitably secured to standards 19 and extending at either side beyond said members are the cross bars 28 on the outer side of which is mounted and welded or otherwise secured the endless upper track member 29 which supports and on which is adapted to travel a plurality of bag holders F suitably connected at their inner ends to an endless drive chain 30 mounted at the forward end of the machine on an idler sprocket 31 mounted on the vertical shaft 32, and at the opposite end on sprocket 33 driven by shaft 34 which is connected to suitable driving mechanism directly more fully explained, said chain 30 being slidably supported on track 35 constructed of wood or other material and mounted on cross bars 28, which mechanism and associated parts hereinafter more fully referred to and are more particularly described in my co-pending application Serial No. 765,136, filed July 31, 1947.

In order to deliver the citrus fruit or other substantially spherical objects G to the conveyor E there is suitably mounted adjacent the receiving end of said conveyor the delivery trough 36 extending above and having an inclined apron portion 37 projecting over the end of said conveyor for delivering the fruit G by gravity to the conveyor. If desired, an endless belt conveyor (not shown) may be mounted in said trough 36. Mounted adjacent the opposite end of conveyor E is a fruit receiving downwardly inclined trough 38 adapted to receive any excess fruit for delivery to a suitable elevating conveyor means for redelivery to the feeding trough 36 as will be hereinafter more fully explained, said trough 38 being suitably attached to frame member 39 and connected to sideboard 38a suitably secured to frame member 11' and extending forwardly to the rear end chute strip 42 to prevent overflow of fruit G from the lower side of conveyor E and direct same into trough 38.

Mounted on members 9' and which may be welded or otherwise suitably secured thereto and to track member 12 is an angle member 40 extending substantially the length of conveyor E, the flat surface 41 being inclined to form a seat extending at a pronounced angle with respect to rollers 4 of conveyor E for the upper ends of the inclined triangular chute forming strips 42, the apex of which, in the present instance is slightly flattened as at 42'.

Preferably there are a plurality of said strips formed of wood or other suitable material, in the present instance, two and three-fourths inches wide by one and one-fourth inches thick arranged parallel on four inch centers throughout the length of said member 40 so as to form intermediate the strips a predetermined number of chutes 43, in the present instance twenty-five, although the number may be varied according to the particular requirement of oranges or other articles to be packaged in each of the respective bags H, as will directly be more fully explained.

Each of the respective strips 42 is supported at its lower end on a block 44 formed with an angular surface 44', in alignment with surface 41 and secured by a bolt 45 extending through said block angle member 24 the upper ends being similarly secured to angle member 40 by bolt 45, the lower ends of said strips 42 projecting downwardly beyond said blocks 44. This arrangement of the strips 42 forms narrow spaces at the bottom of the respective chutes 46.

Figure 18:
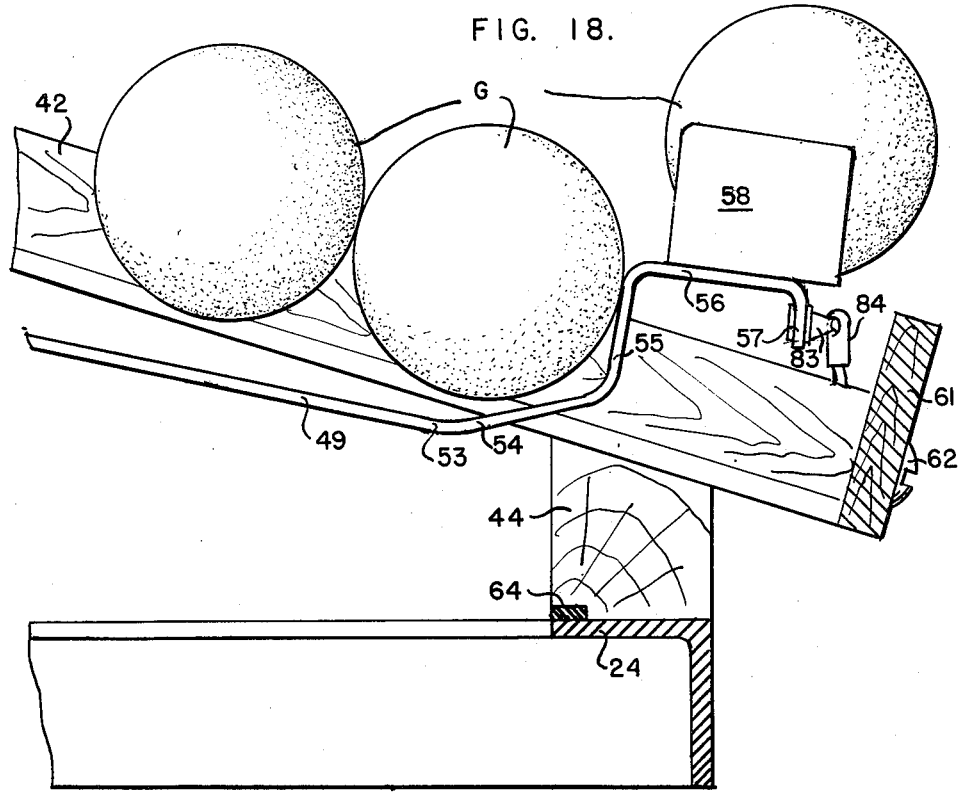
Fig. 18 is an enlarged fragmentary detail view substantially similar to Fig. 16 with the lowermost fruit elevated and in ejecting position, and the remaining fruit held against downward movement during the ejecting operation.

Welded or otherwise secured to angle beam 40 is a series of spaced plates 47 formed with openings in their free ends through which extends a rod 48 extending the length of the chute assembly, said rod being suitably secured therein. Mounted on said rod is a series of ejector rod or finger elements 49 formed with eyelets 50 at one end and rotatably mounted on rod 48 in alignment with spaces 46 between collars 51 secured by set screws 52. Said rods 49 normally extend downwardly at an angle from rod 48 to a point 53 and upwardly forming a fruit or other object engaging seat 54 and a fruit engaging retaining shoulder 55, then outwardly forming the ejector seat 56 and downwardly forming an anchor portion 57. (Fig. 18.)

Mounted in each of the respective chutes 43 adjacent its lower end is a substantially V-shaped single fruit or other object elevating ejector member 58 (Figs. 11 and 12) adapted to seat in cut-out portions 59 so that its surface will be flush with the surface of the adjacent strips 42, said member 58 adapted to be supported on seat 56 of the rod or lifter finger 49 by rivets, bolts, or other fastening means 60, said ejector adapted to lift a single fruit to eject same from said chute 43 when finger 49 is raised (Fig. 18) and as hereinafter more fully described. Secured to the ends of the respective strips 42 and projecting thereabove is an end piece 61 extending the length of the chute assembly and secured to the lower ends of said strips by screws 62, said end piece having arcuate or semi-circular cut-out portions 63 for directing each single piece of fruit or other article as it is delivered thereover from ejector 58, and mounted on frame member 24 adapted to form a cushioning seat for ejector finger 49 is a rubber or other shock absorbing means 64 glued or otherwise secured thereto to effect a shock absorbing medium for said finger 49 when the finger reaches the limit of its downward movement as will be well understood.

Mounted adjacent the lower edge of conveyor E adjacent feed trough apron portion 37 is a side board 65 secured by fastening means 65' forming a continuation of the trough apron portion 37 and extending to the chute assembly to prevent discharge of the fruit from conveyor E before it reaches the chutes 43.

Travel of the conveyor E in conveying direction causes rotation of the rollers 4 which not only effects distribution of the fruit lengthwise of the conveyor, but the rotation of the rollers effects rotation of the fruit, and when the slope of the conveyor, at the same time is caused to gravitationally rotate downwardly and feed from the side of the conveyor to the chutes 43, the fruit being continuously distributed throughout the length of the conveyor and to the chute assembly, and the excess fruit discharging over the end of the conveyor to the inclined trough for delivery to suitable elevator means to be returned to the entering or feeding end of the conveyor distributor as will be well understood.

In order to prevent excess rows of fruit building up on the chute assembly other than the single row in each of said chutes an upstanding pin 66 is suitably mounted in the upper end of each of the strips 42 and these pins 66 may also be employed as supports for any desired number of cut off fruit stop sections 67, said section 67 being formed at each end with a looped end portion 68 being in staggered relation, these sections being adapted to cut off the flow of fruit to any desired number of the chutes, said sections 67 coacting with each other to form a continuation of section 65.

The column of fruit in each of said chutes may be termed live storage and when the elevation of the lower end of finger 49 lifts the ejector 58 from the position shown in Fig. 16 to the position shown in Fig. 18 carrying with it the lowermost fruit or object and the next or adjoining fruit G is engaged by shoulder 55 thereby tending to impart a rearward movement to the said fruit slightly in fruit column thereby permitting free ejecting movement of the single fruit carried by the elevator, and when the elevator reaches the limit of its upward movement the fruit carried by the elevator rolls outward and is directed by the semi-circular cut out portions 63 over end piece 61 for discharging into bag H in a manner directly more fully appearing.

Figure 19:
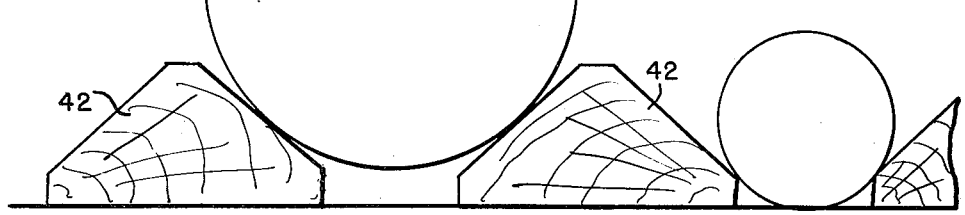
Fig. 19 is an enlarged fragmentary section through the feed chutes showing the relation and manner of feeding of different sized fruit by the chutes.
Figure 20:
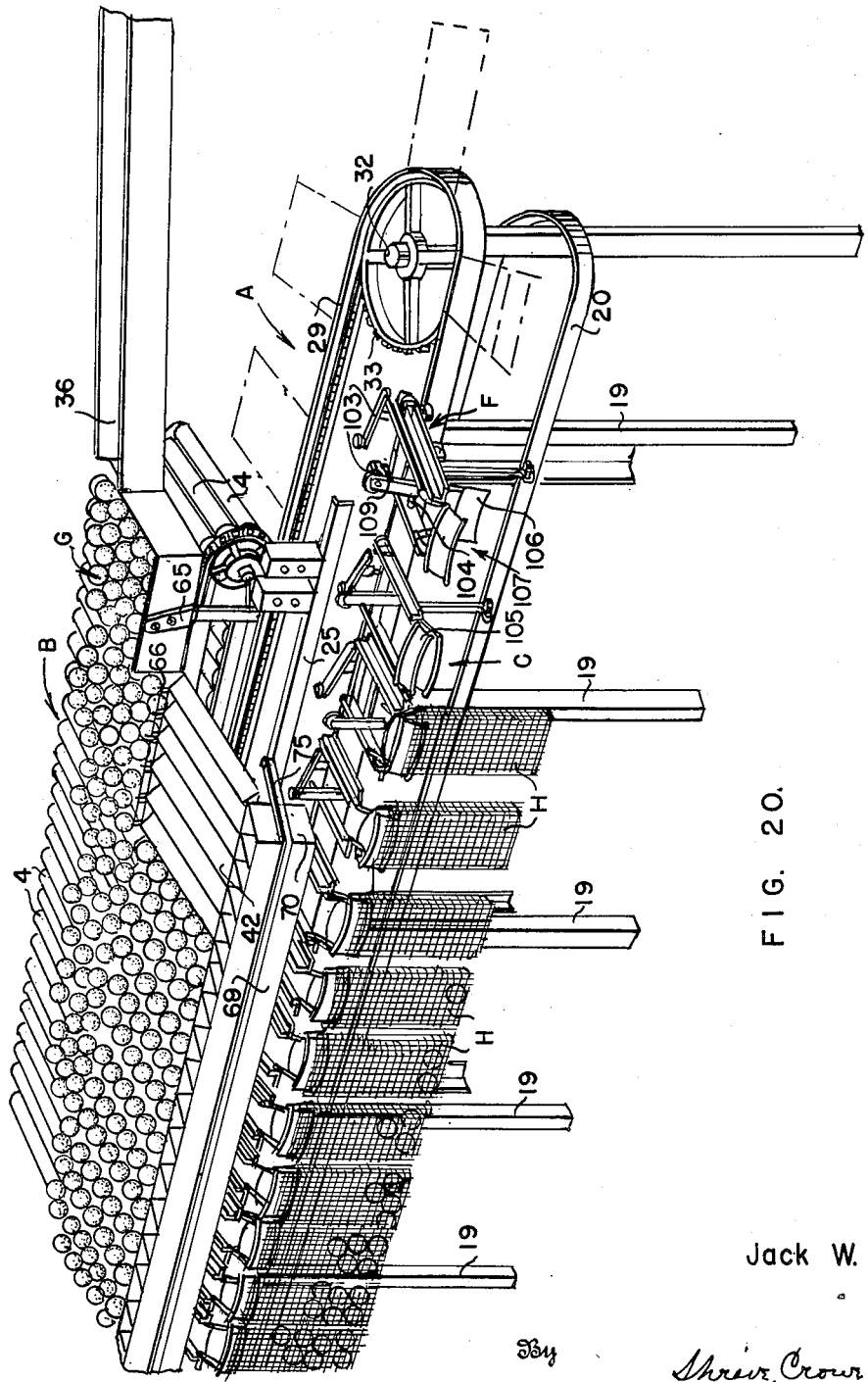
Fig. 20 is a perspective view of the portion of the machine as substantially shown in Figs. 1 and 3.

It will be observed that the construction and angular arrangement of the chutes 43 permit different sized fruit or other objects of a spherical type to be fed by the chutes and individually delivered therefrom over wide range of sizes automatically, without necessity of adjustments as will be clear from Fig. 19 of the drawings.

Figure 14:
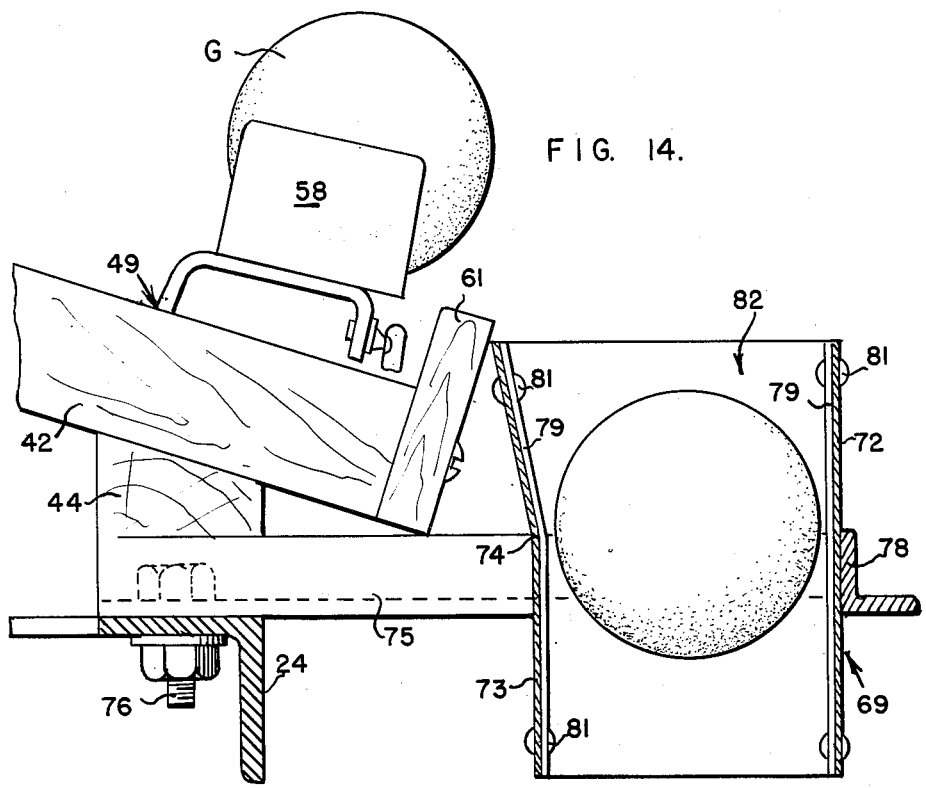
Fig. 14 is an enlarged fragmentary side elevation of one of the chute elements and ejector mechanism in fruit ejecting position, and vertical section of the fruit receiving hopper with its supporting frame partly in section.
Figure 15:
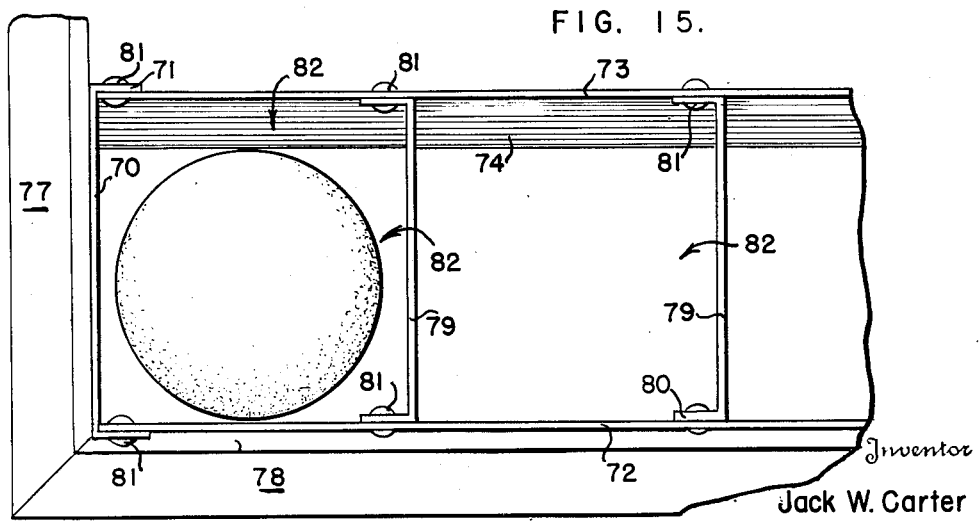
Fig. 15 is a fragmentary top plan view of the left rear end of the hopper structure.

Mounted adjacent the chute end board 61 and extending the length thereof is a fruit receiving substantially rectangular hopper-like element 69 (Fig. 14), formed of sheet metal or other similar material and comprising end pieces 70 having right angle flanges 71, a front side 72 and a rear 73, said latter side being flared rearwardly from 74 to its upper edge which is adapted to engage board 61 slightly below its upper edge (Fig. 14). Said sides at their respective ends being connected to flanges 71 by soldering, riveting or otherwise as desired. The right end 70 substantially of its length is suitably secured to an angle supporting arm 75 with its inner end seating in angle frame member 24 and secured thereto by bolt 76. The left end 70 is secured in like manner to arm 77 corresponding to arm 75 and is supported on and is similarly secured to frame member 24. Interconnecting the free ends of arms 75 and 77 to which it is secured by welding or otherwise is angle member 78 suitably secured to side 72, and which with said arms constitutes a supporting frame for said element 69.

A plurality of partition members 79 formed with end flanges 80 are positioned in equi-spaced relation in said hopper-like element 69 and secured to sides 72 and 73 by rivets 81, so arranged as to form in alignment with each chute 43 substantially hopper-like chutes 82 adapted to receive a single fruit G as it is delivered thereto by ejector 58 (Fig. 14) and directs it into a bag passing thereunder, as will directly more fully appear.

Suitably mounted and secured in the depending anchor portion 57 of the ejector rod finger 49 is a member 83 formed with a ball-end adapted to seat in a cylindrical socket member 84 forming a ball and socket connection, and threadedly or otherwise secured in the free end of said socket member is an operating rod 85 comprising sections 86 and 87. The upper end of section 86 is threaded or otherwise suitably secured in the free end of socket member 84 and is provided at its lower end with right hand threads 88, and the upper end of section 87 is formed with left hand threads 89, said threaded portions being engageable in a turnbuckle sleeve 90 correspondingly threaded so as to adjust the length of the complete rod 85.

Mounted on the lower end of section 87 is a socket member 91, similar to 84, and adapted to receive a ball-member 92, similar to member 83, said member 92 being secured to the wall of the hollow or shell-like cam end 93 of cam arm 94 by a pin 95 or in any well known manner.

Figure 11:
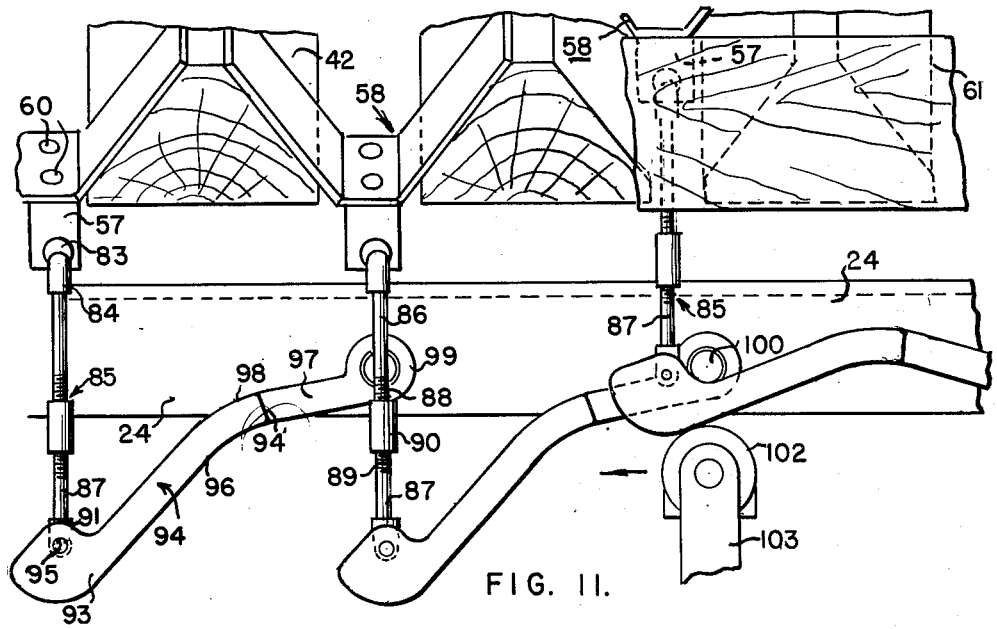
Fig. 11 is a fragmentary front elevation of the feed chutes showing the fruit ejector mechanism.
Figure 12:
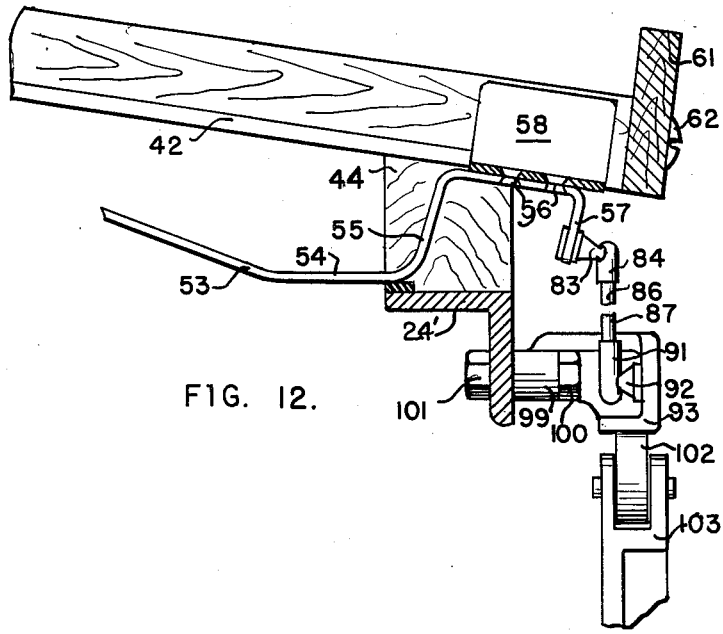
Fig. 12 is a fragmentary side elevation of one of the chute elements and ejector mechanism taken on the line 12—12 of Fig. 11 with parts in section.

The arm 94 extends upwardly at an angle from end 93 to the offset portion 94' forming the cam surface 96, the end portion 97 of cam arm 94 being inwardly and integrally offset from the cam surface portion 96 of said arm as at 98, and is formed on its end with a bearing hub 99 journaled on pin 100 extending through and secured to angle frame member 24 by a nut 101, as shown in Fig. 11 of the drawings.

Figure 2:
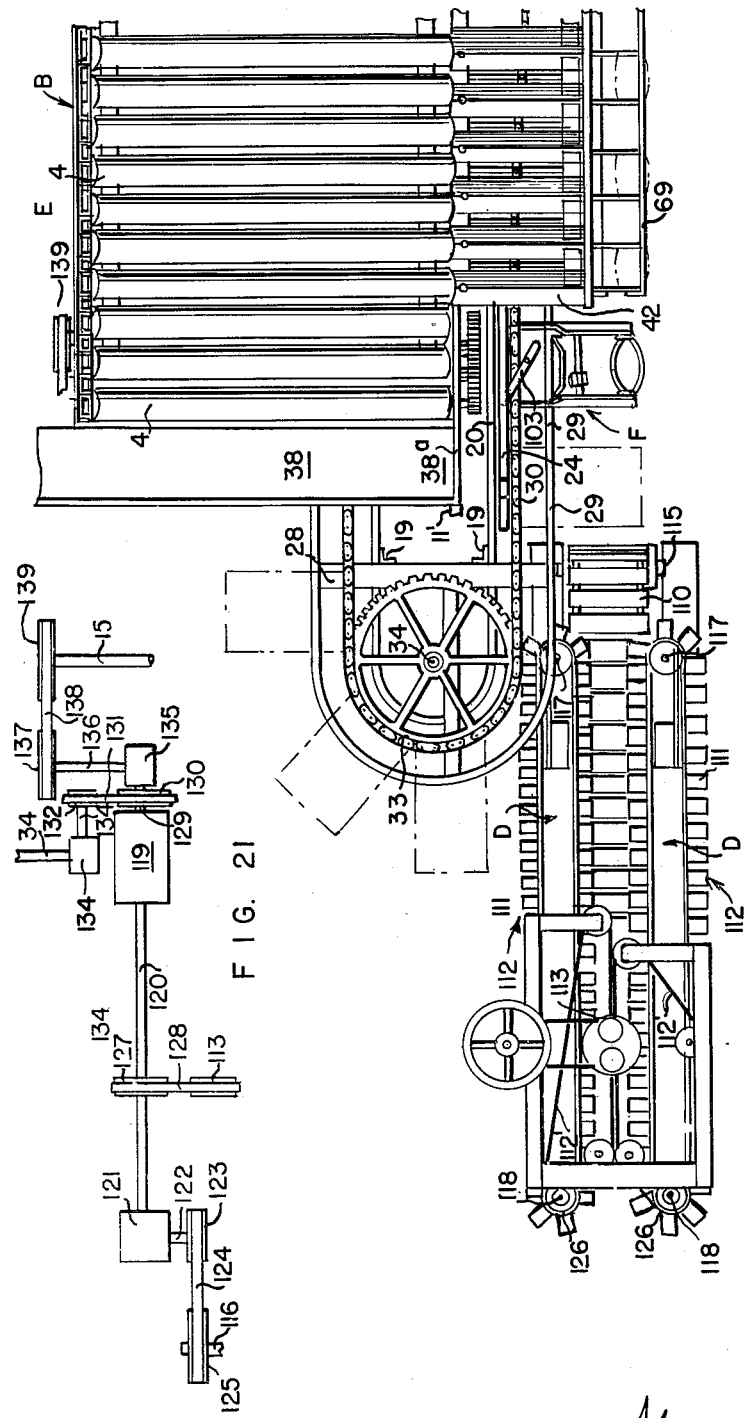
Fig. 2 is a similar view to Fig. 1 of the remaining portion of said machine.
Figure 3:
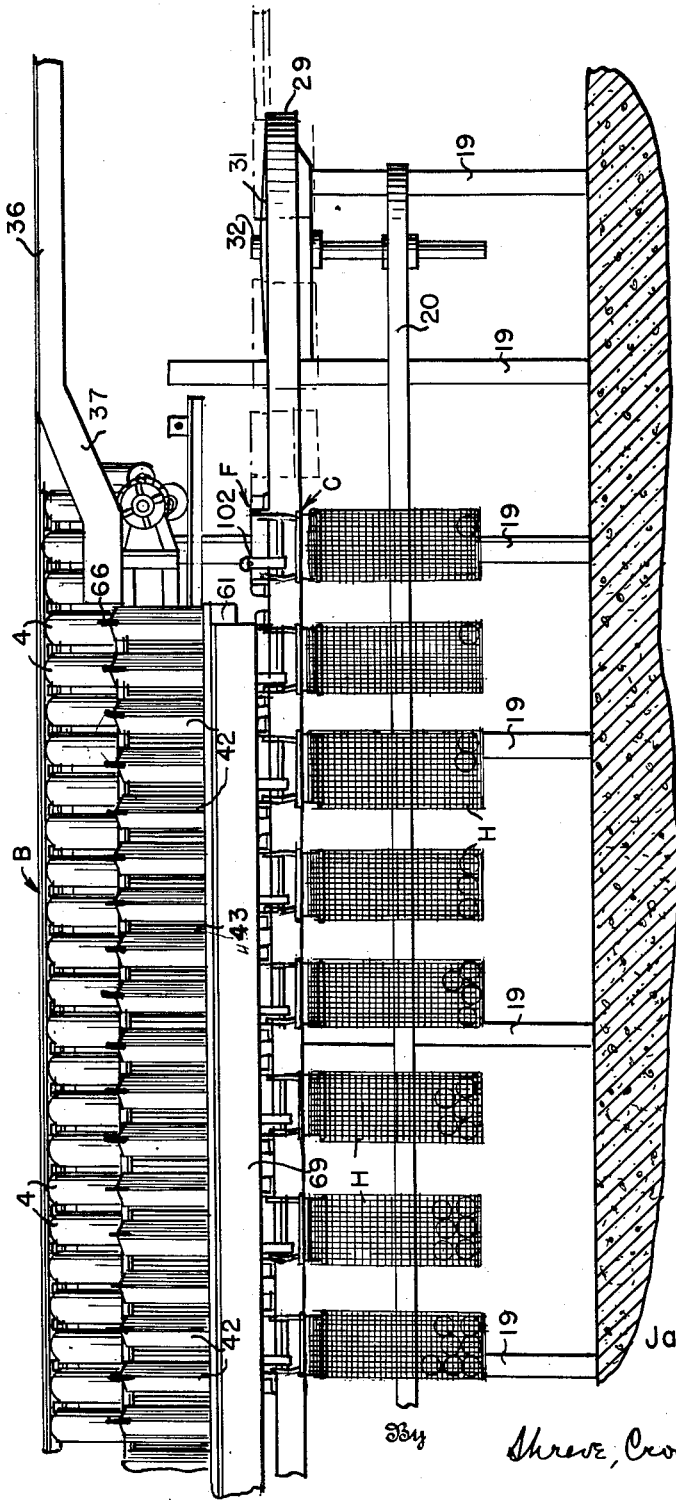
Fig. 3 is a front elevational view of the machine as substantially shown in Fig. 1.
Figure 4:
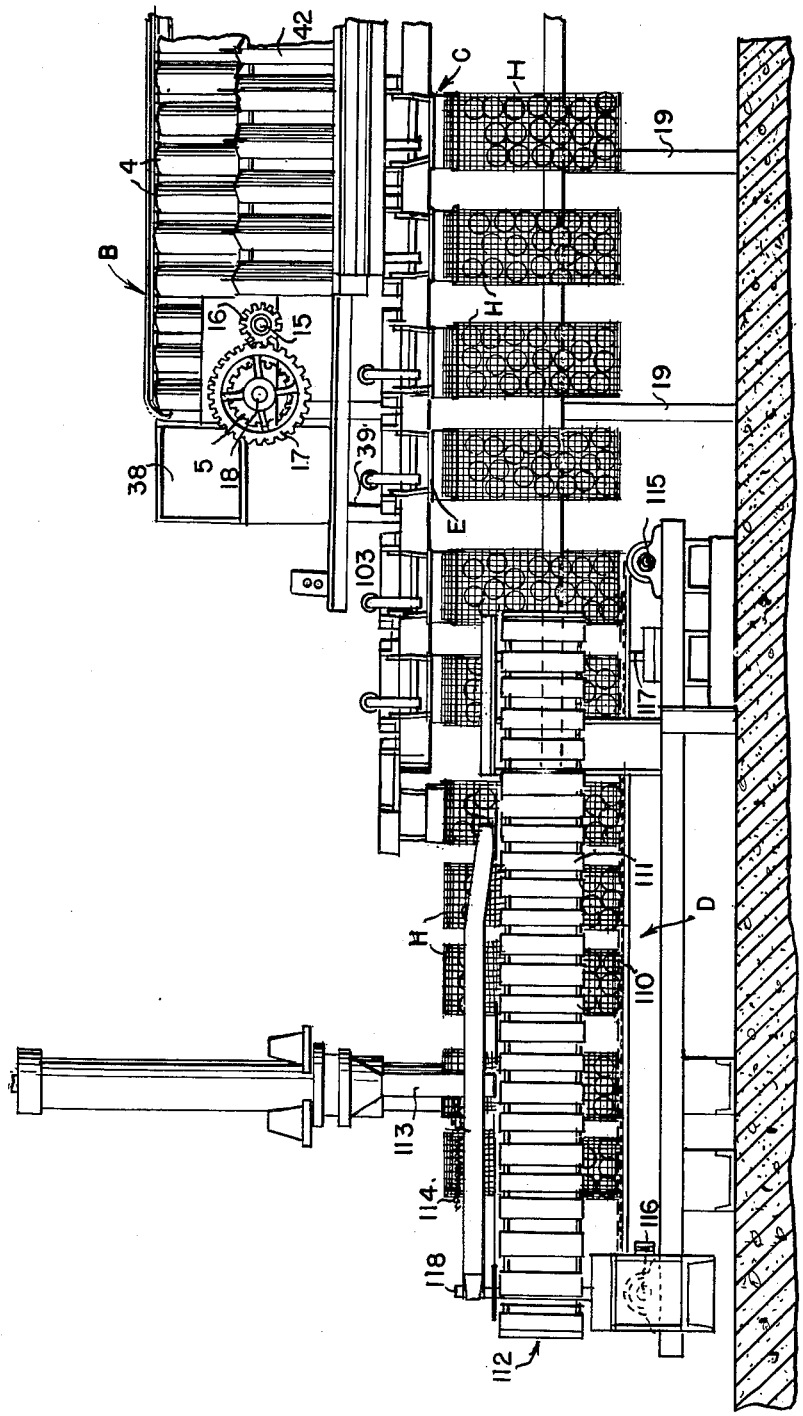
Fig. 4 is a front elevational view of the remaining portion of the machine as shown in Fig. 3, and of the portion substantially shown in Fig. 2.
Figure 13:
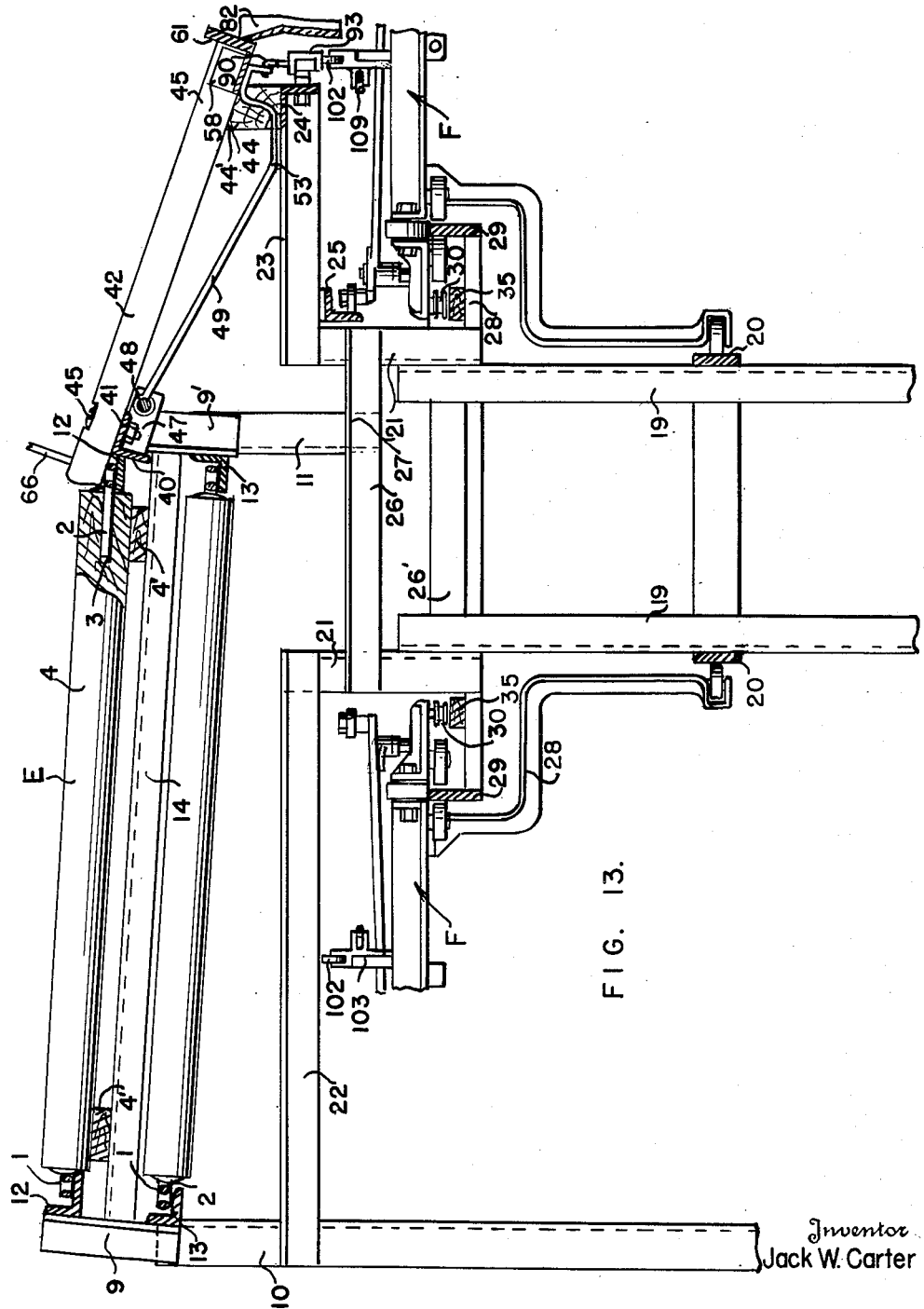
Fig. 13 is a cross-section through the machine taken on the line 13—13 of Fig. 1.

Each of these cam arms is adapted to be engaged by a cam roller 102 mounted on the upper end of cam arm 103 carried by the bag holder carriage F mounted on rod 104 and connected to the front jaw 105 which with jaw 106 forms the mouthpiece 107 adapted to expandingly hold the bags thereon, and which are maintained against slipping therefrom by the bead or lip 108 (Fig. 1). Said cam arm 103 also carries a horizontal cam roller 109, the cam action of which operates jaw 105 in the course of the withdrawal of the jaw from the filled bag. Said carriage F is connected to the endless drive chain 30 as hereinbefore referred to (Figs. 2 and 13), so that as each of the bag holding carriages travel in bag filling direction cam roller 102 will successively engage the respective cam arms 94 to effect elevation of said ejector member 58 (Fig. 11) to eject the lowermost fruit through hopper chute 82 into a bag H carried by said mouthpiece 107. The description of the bag holders, carriage and track assembly, is more particularly described in my co-pending application, Serial No. 765,136, filed July 31, 1947.

After the filled bags pass beyond the chutes 43, and as they reach the rear curved end of track 29, and the mouthpiece 107 is collapsed and withdrawn from the top of the bag, they are delivered to the bottom endless conveyor 110 of the bag closure and delivery unit D and are gripped on opposite sides by the sponge-like or other resilient material elements 111 of the vertical conveyors 112, and the mouths of the bags are gripped by suitably mounted endless chains or belts 112' and directed in a straight line through the sewing machine 113 where the mouth is closed by a line of stitching 114 for delivery therefrom. Said conveyor 110 is mounted at its front end on shaft 115 and at its rear end on drive shaft 116 and the vertical conveyors 112 are mounted at their receiving ends on vertical shafts 117 and at their discharge ends on drive shafts 118.

The driving arrangement with respect to the three coacting units of the machine from a source of power is diagrammatically illustrated in Fig. 21. Said source of power comprises an electric motor 119, in the present instance, mounted beneath the rear end of the distributor mechanism E and adjacent the filled bag closure and delivery unit D. The drive from said motor is through a motor shaft 120 which extends rearwardly to a gear box 121 adjacent the end of bag closure unit A and therefrom through shaft 122, pulley 123 mounted thereon, belt 124, pulley 125 mounted on drive shaft 116, driving conveyor 110, and through gear connections between shaft 116 and shafts 118, driving the vertical conveyors 112, and through the vertically adjustable drive sprockets 126 driving gripping chains or belts 112'. Mounted on shaft 120 is pulley 127 which drives sewing machine 113 by a belt 128. A second motor shaft 129 extending in a direction opposite to shaft 120 has mounted thereon pulley or sprocket 130 connected by a belt or chain 131 with pulley 132 mounted on shaft 133 connected with gear box 134, and connected with said gear box is shaft 34 of sprocket 33 which drives conveyor chain 30 to which are attached the bag holder carriage mechanisms F. The free end of said motor shaft 129 is connected with gear box 135 and having connection therein with shaft 136 on which is mounted pulley or sprocket 137, and by belt or chain 138 with pulley or sprocket 139 mounted on drive shaft 15 and pinion 16 meshing with gear wheel 17 on extension 18 of shaft 6 of distributor roller conveyor E for driving the latter.

It will be apparent that I have provided a machine for packaging citrus fruit and the like embodying improved means for distributing and feeding said articles to a battery of feed chutes in which are mounted means for ejecting the lowermost fruit from each chute to bags traveling throughout the length of said chutes in succession carried by bag-holding mechanisms, and for delivering from the bag-filling mechanism the filled bags to be conveyed to and through a bag closure and delivery mechanism.

As hereinbefore stated the subject matter of the second and third mechanisms have been more clearly described and claimed in my co-pending applications, and, therefore, as to this application, it wil be noted that I have provided means for delivering citrus fruit or the like to a battery of sharply inclined feed chutes closed at their lower ends, comprising an endless roller conveyor inclined throughout its length to the open ends of said chutes for effecting rotational distribution of the fruit throughout the length of the conveyor and at the same time gravitationally therefrom to the series of chutes, and ejecting mechanism mounted in the lower end of each chute constructed and operable in a manner to elevationally eject the lowermost fruit or article in each chute, and at the same time holding the remaining column of fruit in the chute from downward movement during the ejecting operation, said ejecting mechanism being adapted to be operated by means carried by the bag-filling mechanism to effect discharge of a single fruit from each of the chutes successively to each bag during their travel along the length of the battery of chutes, said distributing and feeding mechanism comprising comparatively few parts, readily assembled, manufacturable at a reasonable cost, and efficient for the purposes intended.

Although in practice I have found that the form of my invention illustrated in the accompanying drawings and referred to in the above description as the preferred embodiment, is the most efficient and practical, yet realizing that conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. A distributing and feeding mechanism for citrus fruit and other articles of a spherical nature, comprising a series of parallel feed chutes disposed at an angle with respect to a horizontal plane, said chutes being closed at their lower ends and open at their upper ends, and endless conveyor arranged in feeding relation with respect to the upper ends of the chutes and inclined in the direction of the chutes, said chutes being formed with divergent sidewalls, means associated with the lower ends of the chutes for successively effecting discharge in a predetermined direction of the lowermost article from each chute progressively throughout the series of chutes, while at the same time retaining the remaining articles against descending movement, and hopper means coacting with the lower ends of the respective chutes adapted to receive the discharged articles.

2. A distributing and feeding mechanism for citrus fruit and spherical-like objects, comprising a series of parallel feed chutes disposed at an angle with respect to a horizontal plane, said chutes being permanently closed at their lower ends and open at their upper ends, an endless conveyor arranged in feeding relation with respect to the upper ends of the chutes and inclined laterally in the direction of the chutes, said chutes being formed with divergent sidewalls, vertically disposed guide means mounted on the upper ends of said chutes intermediate adjacent chutes adapted to direct the articles into said chutes, and means detachably associated with said guide means for cutting off the discharge of the articles from said conveyor to certain of the chutes, means associated with the lower ends of the chutes for successively effecting discharge of the lowermost article from each chute throughout the series of chutes, while at the same time retaining the remaining articles against descending movement, said last mentioned means including additional means for preventing lateral displacement of the fruit when discharged, and hopper means coacting with the lower ends of the respective chutes adapted to receive the discharged articles.

3. A distributing and feeding mechanism for citrus fruit and other spherical-like articles, comprising a series of parallel feed chutes disposed at an angle with respect to a horizontal plane, said chutes being closed at their lower ends and open at their upper ends, an endless conveyor arranged in feeding relation with respect to the upper ends of the chutes and inclined in the direction of the chutes, said chutes being formed with divergent sidewalls, means associated with the lower ends of the chutes for successively effecting discharge in a selected direction of the lowermost article from each chute throughout the series of chutes, while at the same time retaining the remaining articles against descending movement, said means including a pivotally supported vertically movable ejector member, and a traveling mechanism for imparting elevating movement to said ejector member, said mechanism being adapted to successively operate the respective ejector members, and hopper means coacting with the lower ends of the respective chutes adapted to receive the discharged articles.

4. A distributing and feeding mechanism for citrus fruit and articles of a spherical nature to be packaged, comprising a battery of parallel feed chutes disposed at an angle with respect to a horizontal plane, said chutes being closed at their lower ends and open at their upper ends, an endless conveyor arranged in feeding relation with respect to the upper ends of the chutes and inclined in the direction of the chutes, said chutes being formed in a manner to arrange the articles fed thereto in respective columns, means associated with the lower ends of the chutes for successively effecting in a predetermined direction discharge of the lowermost article from each chute throughout said battery, while at the same time retaining the remaining columns of articles against descending movement, said means including a pivotally supported vertically movable ejector member for the lowermost article, and means associated therewith for retaining the remaining column against movement during the ejecting operation, and a traveling mechanism for imparting elevating movement to said ejector member, said mechanism being adapted to successively operate the respective ejector members, and hopper means coacting with the lower ends of the respective chutes adapted to receive the discharged article.

5. A distributing and feeding mechanism for citrus fruit and other articles of a spherical nature, comprising a series of parallel feed chutes disposed at an angle with respect to a horizontal plane, said chutes being closed at their lower ends and open at their upper ends, an endless conveyor arranged in feeding relation with respect to the upper ends of the chutes and inclined in the direction of the chutes, said chutes being formed with divergent side-walls, said side-walls forming spaces at their lower edges, pivotally mounted vertically movable ejector mechanisms arranged in the respective chutes and operable in said spaces for ejecting the lowermost article from each chute, each of said mechanisms including a pivotally mounted rod-like member and a lowermost article ejecting element carried by said rod, means for operating the respective ejector elements to effect the discharge of the lowermost fruit successively throughout the series of chutes, and means coacting with the lower end of the chutes for receiving the discharged articles.

6. A distributing and feeding mechanism for citrus fruit and other articles of a spherical nature, comprising a series of parallel feed chutes disposed at an angle with respect to a horizontal plane, said chutes being closed at their lower ends and open at their upper ends, an endless conveyor arranged in feeding relation with respect to the upper ends of the chutes and inclined in the direction of the chutes, said chutes being formed with divergent side-walls, said side-walls forming spaces at their lower edges, a vertically movable ejector mechanism mounted in each chute for ejecting the lowermost article therefrom, said mechanism including a pivotally supported member and a lowermost article ejecting element carried by said member, said member adapted, when said lowermost article ejecting element is moved in ejecting direction, to maintain the remaining articles in said chute against movement during the ejecting operation, means for operating said ejector elements to discharge the lowermost fruit from said chutes successively throughout said series of chutes, and means coacting with the lower ends of the respective chutes for receiving the discharged articles.

7. A distributing and feeding mechanism for citrus fruit and other articles of a spherical nature, comprising a series of parallel feed chutes disposed at an angle with respect to a horizontal plane, said chutes being closed at their lower ends and open at their upper ends, an endless conveyor arranged in feeding relation with respect to the upper ends of the chutes and inclined in the direction of the chutes, said chutes being formed with divergent side-walls, said side-walls forming spaces at their lower edges, a vertically movable ejector mechanism mounted in each chute for ejecting the lowermost article therefrom, said mechanism including a pivotally supported member and a lowermost article ejecting element carried by said member, said member being formed with an article-engaging seat adapted, when said element is moved in ejecting direction to maintain the remaining articles against movement during the ejecting operation, and means for imparting elevating movement successively to each of the ejector elements throughout said chute series, and hopper means coacting with the lower ends of the chutes to receive the discharged articles.

8. A distributing and feeding mechanism for citrus fruit or other spherical-like articles to be packaged, comprising a battery of parallel feed chutes disposed at an angle with respect to a horizontal plane corresponding in number to the number of articles to be packaged, said chutes being closed at their lower ends and open at their upper ends, a conveyor arranged in feeding relation with respect to the upper ends of the chutes and inclined in the direction of the chutes, said conveyor comprising an endless series of rollers, means for causing rotation of the articles during their feeding travel to the chutes, said chutes being formed in a manner such that the articles fed thereto will be arranged in respective columns, means associated at the upper ends of the chutes for preventing additional columns of the articles accumulating intermediate adjacent chutes, a vertically movable ejector mechanism mounted in the respective chutes for ejecting the lowermost article from each chute, said mechanism including a pivotally supported ejector rod and a lowermost article ejecting member carried by said rod, said rod being formed with an article engaging seat, whereby when said lowermost article supporting member is moved in ejecting direction, said seat will maintain the remaining column of articles against movement during the ejection operation, means for imparting elevating movement to each of the ejector members to eject the lowermost articles from said chutes successively throughout said battery, and hopper means coacting with the lower ends of the respective chutes to receive the discharged articles.

9. A distributing and feeding mechanism for citrus fruit comprising a series of parallel feed chutes disposed at an angle with respect to a horizontal plane, said chutes being closed at their lower ends and open at their upper ends, said chutes having side walls spaced to form a single column of fruit in the chute, an endless conveyor positioned adjacent the upper ends of the chutes and adapted to move substantially horizontally and perpendicularly to the chutes to carry the fruit to the open upper ends of the chutes, said conveyor sloping laterally toward the chutes to feed the fruit thereinto, a substantially vertically movable fruit supporting member at the bottom of each chute, means for periodically moving the fruit supporting member to remove the bottom fruit from the column in the chutes, means associated with the fruit supporting member adapted to engage the fruit adjacent the bottom fruit and support the column as the bottom fruit is removed therefrom, and means coacting with the lower ends of the chutes for receiving the fruit removed therefrom.

10. A distributing and feeding mechanism for citrus fruit comprising a series of parallel feed chutes disposed at an angle with respect to a horizontal plane, said chutes being closed at their lower ends and open at their upper ends, said chutes having sidewalls spaced to form a single column of fruit in the chute, an endless conveyor positioned adjacent the upper ends of the chutes and adapted to move substantially horizontally and perpendicularly to the chutes to carry the fruit to the open upper ends of the chutes, said conveyor comprising a series of parallel rollers mounted substantially perpendicularly to the direction of travel of the conveyor, means for causing rotation of the rollers as the conveyor moves, said conveyor sloping laterally toward the chutes to feed the fruit thereinto, a substantially vertically movable fruit supporting member at the bottom of each chute, means for periodically moving the fruit supporting member to remove the bottom fruit from the column in the chutes, means associated with the fruit supporting member adapted to engage the fruit adjacent the bottom fruit and support the column as the bottom fruit is removed therefrom, and means coacting with the lower ends of the chutes for receiving the fruit removed therefrom.

JACK W. CARTER.

REFERENCES CITED

The following references are of record in the file of this patent:

UNITED STATES PATENTS

| Number | Name | Date |
|---|---|---|
| 369,550 | Phillips et al. | Sept. 6, 1887 |
| 820,034 | Ballard | May 8, 1906 |
| 820,378 | Ballard | May 8, 1906 |
| 1,278,291 | Balwick | Sept. 10, 1918 |
| 1,388,065 | Schmitz | Aug. 16, 1921 |
| 1,717,430 | Young et al. | June 18, 1929 |
| 1,765,950 | Synck | June 24, 1930 |
| 1,844,806 | Smith et al. | Feb. 9, 1932 |
| 1,850,418 | Sankey | Mar. 22, 1932 |
| 1,894,547 | Tucker | Jan. 17, 1933 |
| 1,927,087 | Freese | Sept. 19, 1933 |
| 1,933,147 | Paxton | Oct. 31, 1933 |
| 2,081,441 | Willshaw et al. | May 25, 1937 |
| 2,120,440 | Kramer et al. | June 14, 1938 |
| 2,288,764 | Winship et al. | July 7, 1942 |
| 2,358,240 | Milmoe et al. | Sept. 12, 1944 |
| 2,467,766 | McCaslin | Apr. 19, 1949 |
| 2,507,905 | Hughes | May 16, 1950 |